US008125764B2

(12) United States Patent
Ishida et al.

(10) Patent No.: US 8,125,764 B2
(45) Date of Patent: Feb. 28, 2012

(54) ELECTRONIC COMPONENT (75) Inventors: Atsushi Ishida, Echizen (JP); Takumi Taniguchi, Fukui (JP); Masaki Tani, Nyu-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 162 days.

(21) Appl. No.: 12/761,429

(22) Filed: Apr. 16, 2010

(65) Prior Publication Data
US 2010/0271754 A1 Oct. 28, 2010

(30) Foreign Application Priority Data

Apr. 22, 2009 (JP) ................................. 2009-103771

(51) Int. Cl.
*H01G 4/228* (2006.01)
(52) U.S. Cl. ............... 361/321.1; 361/306.1; 361/306.3; 361/321.2; 361/311; 361/313
(58) Field of Classification Search ............... 361/321.1, 361/321.2, 303, 305, 308.1, 309, 311–313, 361/306.1, 306.3
See application file for complete search history.

(56) References Cited

U.S. PATENT DOCUMENTS

| | | | | |
|---|---|---|---|---|
| 6,327,134 B1 * | 12/2001 | Kuroda et al. | ................ | 361/303 |
| 6,556,421 B2 * | 4/2003 | Aoki et al. | .................... | 361/311 |
| 7,224,572 B2 * | 5/2007 | Togashi et al. | ............. | 361/306.3 |
| 7,304,831 B2 * | 12/2007 | Yoshii et al. | ................ | 361/321.2 |
| 7,430,107 B2 * | 9/2008 | Fukudome et al. | ........ | 361/306.3 |
| 7,719,852 B2 * | 5/2010 | Horie et al. | .................... | 361/763 |

FOREIGN PATENT DOCUMENTS

| | | |
|---|---|---|
| JP | 62-034464 U | 2/1987 |
| JP | 5-175088 A | 7/1993 |
| JP | 5-275269 A | 10/1993 |
| JP | 09-246098 A | 9/1997 |
| JP | 2002-151349 A | 5/2002 |
| JP | 2002-270432 A | 9/2002 |
| JP | 2003-297705 A | 10/2003 |
| JP | 2004-14687 A | 1/2004 |
| JP | 2004-303946 A | 10/2004 |

OTHER PUBLICATIONS

Official Communication issued in corresponding Japanese Patent Application No. 2009-103771, mailed on Aug. 23, 2011.

* cited by examiner

*Primary Examiner* — Nguyen T Ha
(74) *Attorney, Agent, or Firm* — Keating & Bennett, LLP (57) ABSTRACT An electronic component includes a substantially rectangular parallelepiped electronic component body and first to fourth external electrodes. The first to fourth external electrodes are arranged such that a shaped defined by joining the centers of portions of the first to fourth external electrodes on a first main surface with a substantially straight line is substantially square. The first main surface is provided with a substantially linear orientation identifying mark disposed thereon. The orientation identifying mark passes through an intersection of two diagonals of the substantially square shape and extends along the longitudinal direction or the width direction.

5 Claims, 10 Drawing Sheets

ELECTRONIC COMPONENT

BACKGROUND OF THE INVENTION

1. Field of the Invention

The present invention relates to electronic components and, in particularly, to a four-terminal electronic component including four external electrodes each including a portion extending to a main surface and that are arranged such that a shape defined by joining the centers of the four external electrodes on the main surface with a substantially straight line is substantially square.

2. Description of the Related Art

Electronic devices, such as a cellular phone and a portable music player, have become smaller in recent years, and a mounting board implemented on the electronic device has become smaller. As a result, the mounting area of the mounting board has also become smaller. Accordingly, demand for miniaturization of a ceramic electronic component mounted on a mounting board is increasing, and an array ceramic electronic component in which ceramic components are packaged in one chip is often used. The use of such an array ceramic electronic component can reduce both the mounting space and mounting cost, in comparison to when a plurality of components is mounted.

One specific example of such an array ceramic electronic component is a capacitor module that includes a plurality of capacitor units disclosed in Japanese Unexamined Patent Application Publication No. 2004-14687. A perspective view of the capacitor module disclosed in Japanese Unexamined Patent Application Publication No. 2004-14687 is illustrated in FIG. 10.

Figure 10:
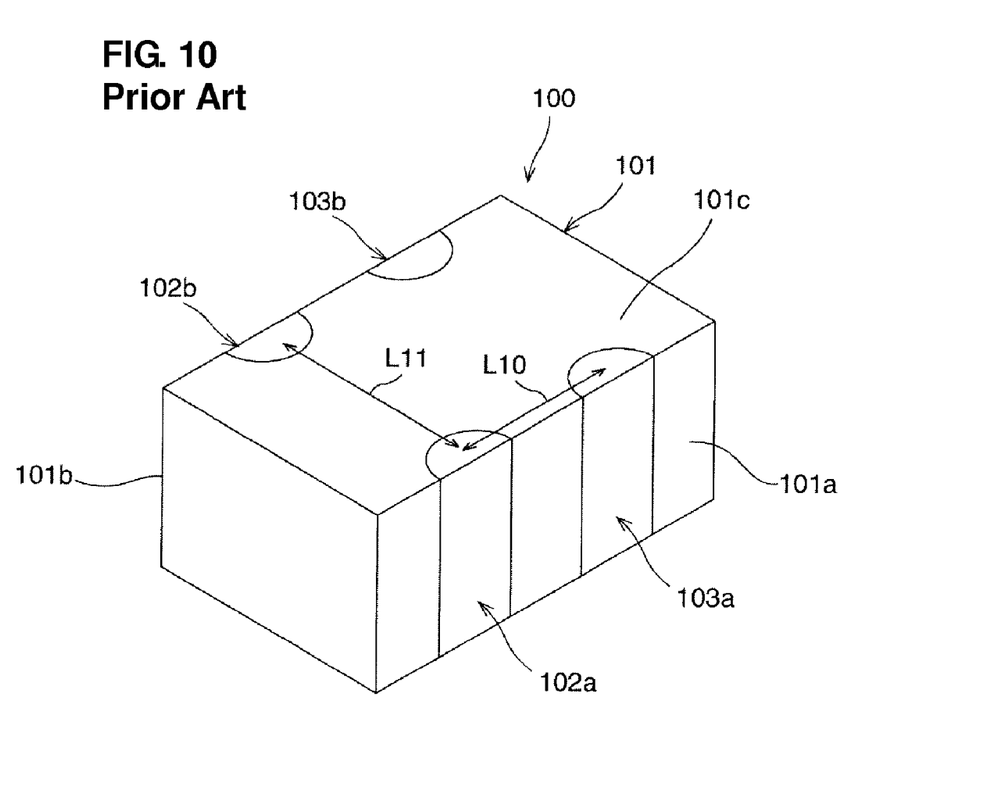
FIG. 10 is a perspective view of a capacitor module disclosed in Japanese Unexamined Patent Application Publication No. 2004-14687.

As illustrated in FIG. 10, a capacitor module 100 is of the four-terminal type. Specifically, the capacitor module 100 includes a substantially rectangular parallelepiped array body 101 made of, for example, ceramic. First and second capacitor units (not shown) are disposed substantially in parallel with each other in the array body 101.

Side electrodes 102a and 103a are disposed at a first side surface 101a of the array body 101 such that they are spaced apart from each other in the longitudinal direction. Side electrodes 102b and 103b are disposed at a second side surface 101b of the array body 101 such that they are spaced apart from each other in the longitudinal direction. The upper end of each of the side electrodes 102a, 103a, 102b, and 103b extends to a first main surface 101c.

Of these side electrodes 102a, 103a, 102b, and 103b, the side electrodes 102a and 102b are connected to the first capacitor unit, and the remaining side electrodes 103a and 103b are connected to the second capacitor unit.

For the capacitor module 100 illustrated in FIG. 10, the side electrodes 102a and 102b positioned at a first side in the longitudinal direction and the side electrodes 103a and 103b positioned at a second side in the longitudinal direction are connected to different capacitor units. Thus, at the time of mounting the capacitor module 100, the orientation of the capacitor module 100 matters. Accordingly, one possible way to determine the orientation of an electronic component is determination of the positional relationship among the portions of the side electrodes on the first main surface 101c by the use of an imaging device (e.g., a camera).

This determination is effective if, on the first main surface 101c, the center-to-center distance L10 between the side electrodes 102a and 103a is different from the center-to-center distance L11 between the side electrodes 102a and 102b, for example.

However, as illustrated in FIG. 10, when the distance L10 is substantially the same as the distance L11, because the four side electrodes are positioned at substantially the same locations both when the side surfaces of the array body lie along the horizontal direction and when the side surfaces lie along the vertical direction, there is a problem in that determining the orientation of the capacitor module 100 is difficult.

Another possible way to determine the orientation of the capacitor module 100 is determination of the shape of the portions of the side electrodes on the first main surfaces by the use of an imaging device. However, the additional determination of the shape of the side electrodes requires significantly high precision for the imaging device and also makes the determination step complicated and difficult.

SUMMARY OF THE INVENTION

Accordingly, a preferred embodiment of the present invention provides a four-terminal electronic component including four external electrodes each including a portion extending to a main surface and that are arranged such that a shape defined by joining the centers of the four external electrodes on the main surface with a substantially straight line is substantially square, thus allowing its orientation to be easily determined.

According to a preferred embodiment of the present invention, an electronic component includes an electronic component body having a substantially rectangular parallelepiped shape, first and second external electrodes, and third and fourth external electrodes. The electronic component body includes first and second main surfaces, first and second side surfaces, and first and second end surfaces. The first and second main surfaces extend along a longitudinal direction and a width direction. The first and second side surfaces extend along the longitudinal direction and a height direction. The first and second end surfaces extend along the width direction and the height direction. The first and second external electrodes are spaced apart from each other in the longitudinal direction on the first side surface. The first and second external electrodes extend to the first main surface. The third and fourth external electrodes are spaced apart from each other in the longitudinal direction on the second side surface. The third and fourth external electrodes extend to the first main surface. The first to fourth external electrodes are arranged such that a shape defined by joining centers of portions of the first to fourth external electrodes on the first main surface with a substantially straight line is substantially square. The first main surface is provided with a substantially linear orientation identifying mark disposed thereon. The orientation identifying mark passes through an intersection of two diagonals of the substantially square shape and extends along the longitudinal direction or the width direction.

According to a particular aspect of the preferred embodiments of the present invention, in the electronic component, the orientation identifying mark may have a length that is longer than the longer of a length of each of the first to fourth external electrodes along the longitudinal direction and a length thereof along the width direction. With this configuration, the orientation of the electronic component can be determined more easily.

According to another particular aspect of the preferred embodiments of the present invention, in the electronic component, the electronic component body may be provided with first and second functional units, at least one of the first to fourth external electrodes may be connected to the first functional unit, and the remaining external electrodes may be connected to the second functional unit.

According to yet another particular aspect of the preferred embodiments of the present invention, in the electronic component, the first and second external electrodes may be connected to the first functional unit, and the third and fourth external electrodes may be connected to the second functional unit.

According to still another particular aspect of the preferred embodiments of the present invention, in the electronic component, each of the first and second functional units may be a piezoelectric unit that produces a piezoelectric effect, a capacitor unit, a thermistor unit, or an inductor unit.

With the preferred embodiments of the present invention, because the substantially linear orientation identifying mark passing through the intersection of the two diagonals of the substantially square shape defined by joining the centers of the portions of the first to fourth external electrodes on the first main surface and extending along the longitudinal direction or the width direction is disposed on the first main surface, the orientation of the electronic component can be easily determined.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

One preferred embodiment of the present invention is described below using a multilayer ceramic electronic component 1 illustrated in FIG. 1 as an example.

Figure 1:
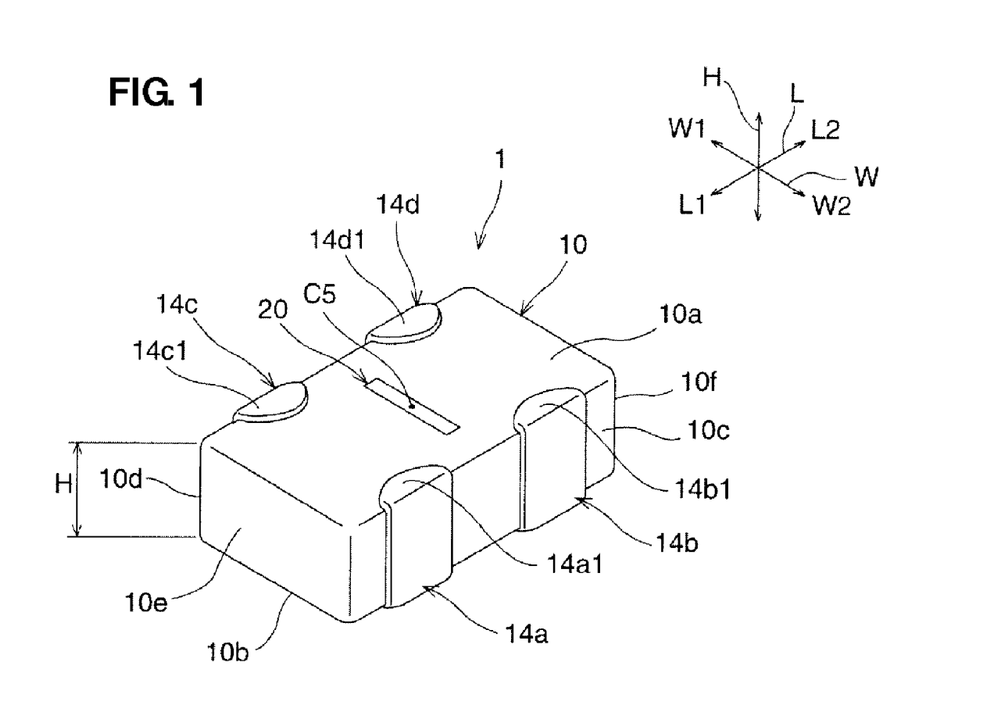
FIG. 1 is a schematic perspective view of a multilayer ceramic electronic component according to a first preferred embodiment of the present invention.
Figure 2:
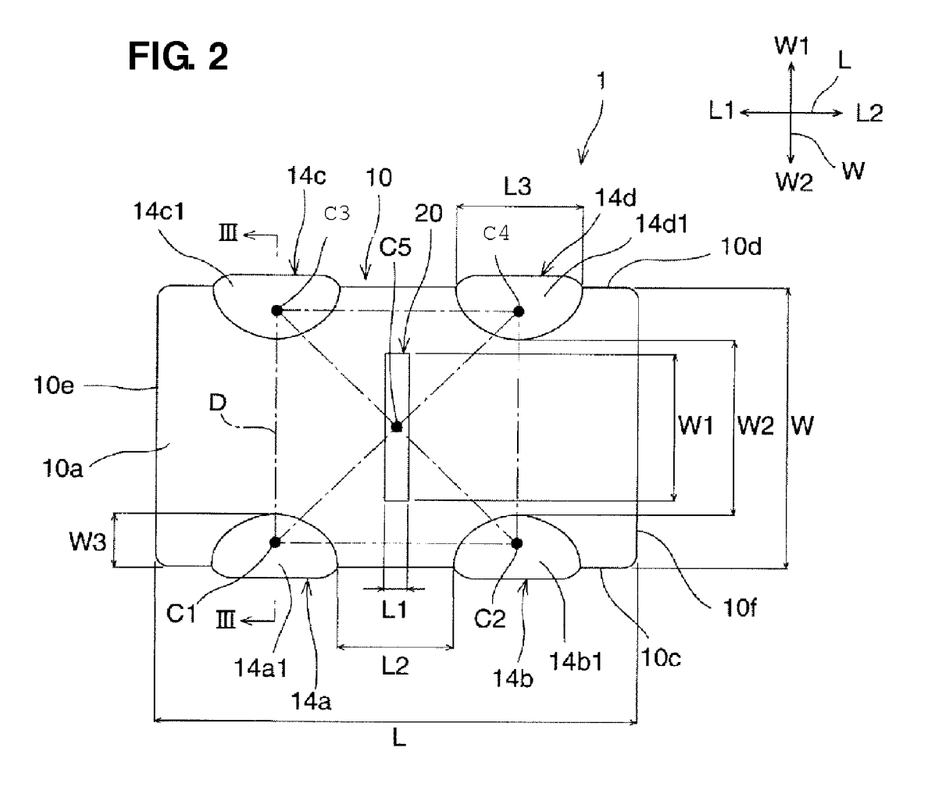
FIG. 2 is a schematic plan view of the multilayer ceramic electronic component according to the first preferred embodiment of the present invention.
Figure 3:
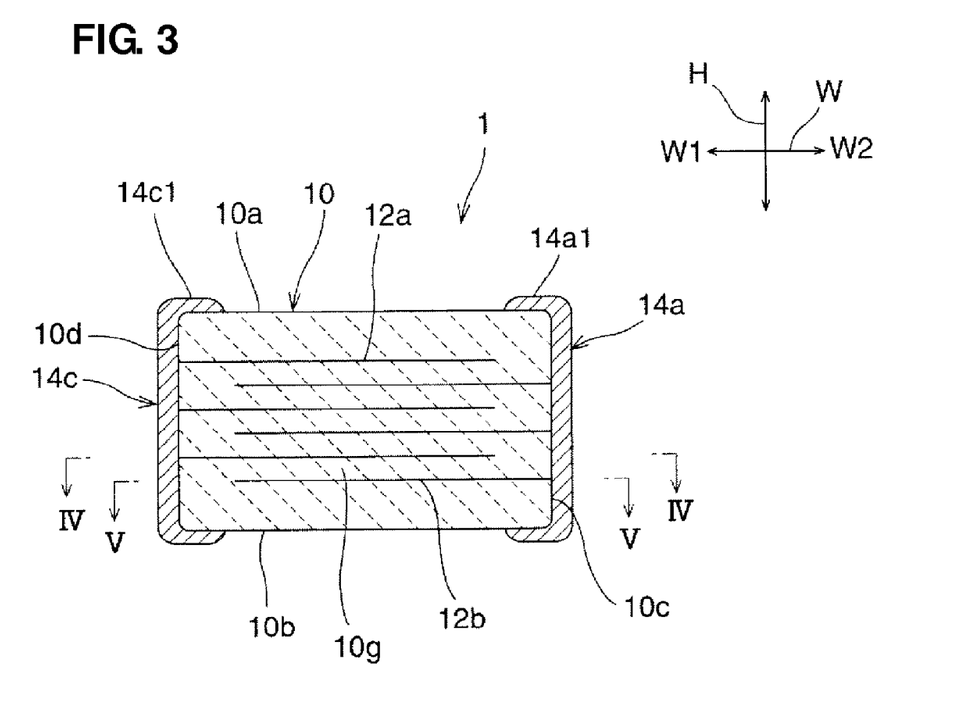
FIG. 3 is a view taken along the line III-III in FIG. 2.
Figure 4:
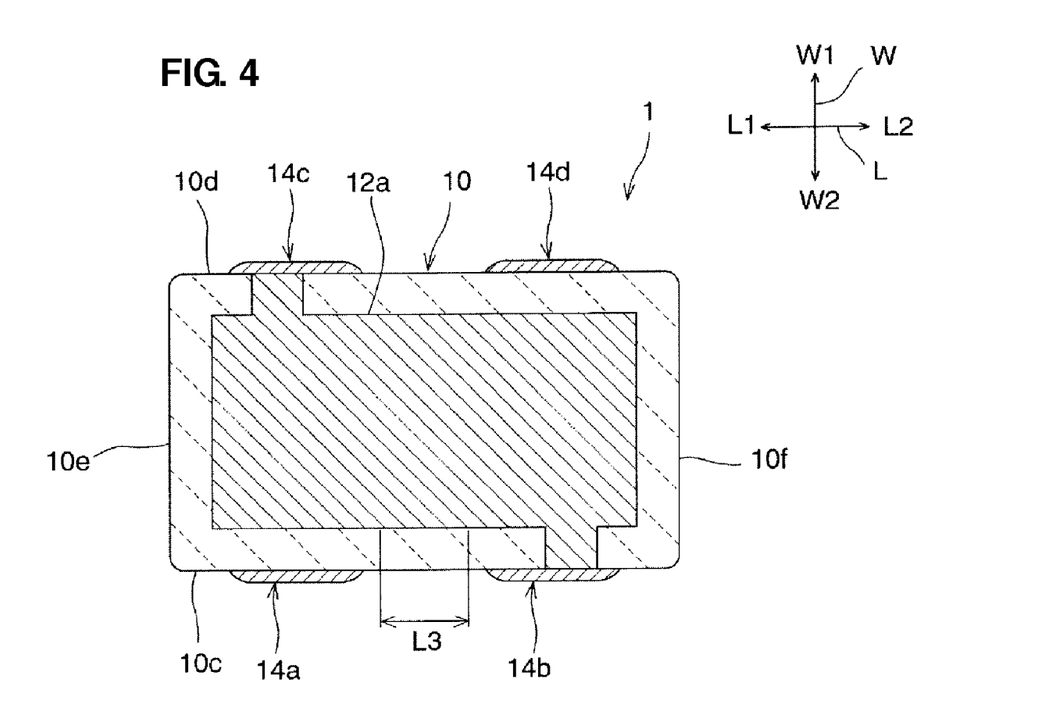
FIG. 4 is a view taken along the line IV-IV in FIG. 3.
Figure 5:
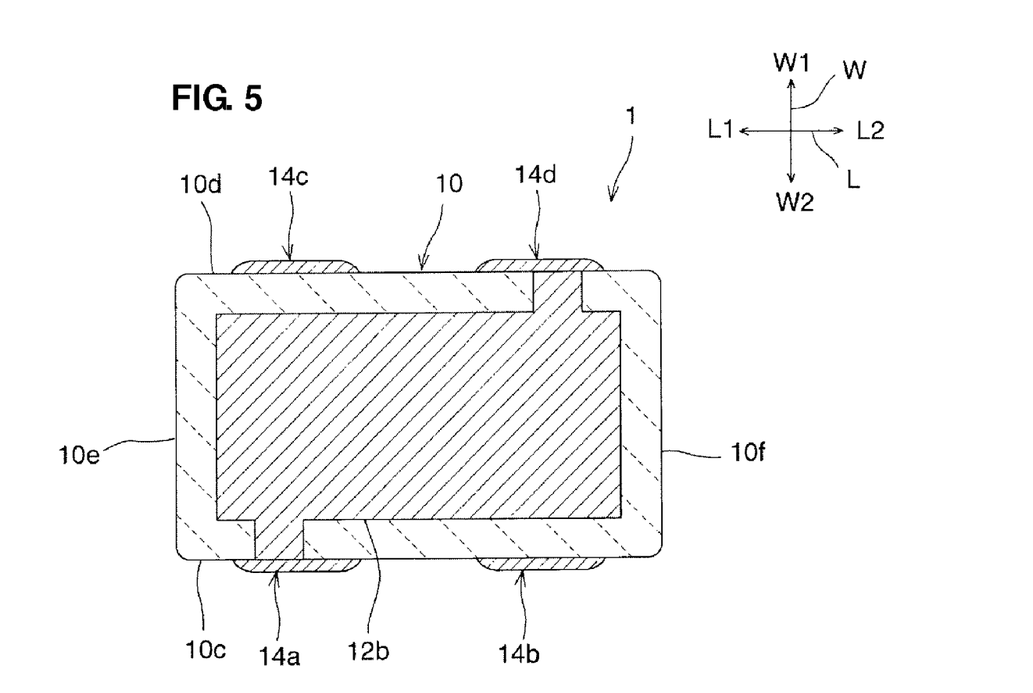
FIG. 5 is a view taken along the line V-V in FIG. 3.

FIG. 1 is a perspective view of the multilayer ceramic electronic component according to a first preferred embodiment of the present invention. FIG. 2 is a schematic plan view of the multilayer ceramic electronic component according to the first preferred embodiment. FIG. 3 is a schematic cross-sectional view taken along the section line III-III in FIG. 2. FIG. 4 is a cross-sectional view taken along the section line IV-IV in FIG. 3. FIG. 5 is a cross-sectional view taken along the section line V-V in FIG. 3.

As illustrated in FIGS. 1 to 5, the electronic component 1 of the present preferred embodiment includes an electronic component body 10 preferably having a substantially rectangular parallelepiped shape. The electronic component body 10 includes first and second main surfaces $10a$ and $10b$ extending along the longitudinal direction L and width direction W, first and second side surfaces $10c$ and $10d$ extending along the longitudinal direction L and height direction H, and first and second end surfaces $10e$ and $10f$ extending along the width direction W and height direction H. The dimensions of the electronic component body 10 preferably are approximately 0.3 mm to 5.0 mm wide (W) by approximately 0.5 mm to 5.7 mm long (L) by approximately 0.1 mm to 2.0 mm high (H), for example. The thickness of a ceramic dielectric layer $10g$ described below preferably is approximately 0.5 μm to 10 μm, for example.

The term "substantially rectangular parallelepiped" used in the description of preferred embodiments of the present invention is not limited to a rectangular parallelepiped in a strict sense and includes a substantially rectangular parallelepiped including a beveled or radiused corner or edge.

In the present preferred embodiment, the electronic component body 10 is preferably made of ceramic. The ceramic defining the electronic component body 10 can be appropriately selected depending on the functions of the electronic component 1.

When the electronic component 1 is a ceramic capacitor, for example, the electronic component body 10 can be made of dielectric ceramic. Specific examples of the dielectric ceramic can include barium titanate ($BaTiO_3$), calcium titanate ($CaTiO_3$), strontium titanate ($SrTiO_3$), and calcium zirconate ($CaZrO_3$), for example.

Alternatively, when the electronic component 1 is a ceramic piezoelectric element, for example, the electronic component body 10 can be made of piezoelectric ceramic. A specific example of the piezoelectric ceramic can be lead zirconate titanate (PZT)-based ceramic, for example.

Alternatively, when the electronic component 1 is a thermistor, for example, the electronic component body 10 can be made of semiconductor ceramic. A specific example of the semiconductor ceramic can be spinel-based ceramic.

Alternatively, when the electronic component 1 is an inductor, for example, the electronic component body 10 can be made of magnetic ceramic. A specific example of the magnetic ceramic can be ferrite ceramic.

If necessary, an accessory ingredient, such as manganese compound, iron compound, chromium compound, cobalt compound, or nickel compound, for example, can be added to ceramic being the main ingredient of the electronic component body 10.

When an orientation identifying mark 20, which is described below, is made from a float internal conductor, a portion of the electronic component body 10 provided on the orientation identifying mark 20 may preferably be made of translucent ceramic, for example.

As illustrated in FIGS. 3 to 5, first and second internal electrodes $12a$ and $12b$ are alternately disposed along the height direction inside the electronic component body 10 so as to be spaced apart from each other.

Each of the first and second internal electrodes $12a$ and $12b$ includes opposed sections and lead sections connecting the opposed sections with first to fourth external electrodes $14a$ to $14d$, which is described below.

Any material can be used in each of the first and second internal electrodes $12a$ and $12b$ as long as it is a conductive material. For example, each of the first and second internal electrodes $12a$ and $12b$ can be made of metal (e.g., copper, nickel, silver, palladium, or gold) and an alloy (e.g., an alloy of silver and palladium). The thickness of each of the first and second internal electrodes $12a$ and $12b$ is not especially limited, and it may preferably be approximately 0.3 μm to 2 μm, for example.

As illustrated in FIGS. 1 to 5, in the electronic component 1, the first to fourth external electrodes 14a to 14d are disposed on the first and second side surfaces 10c and 10d.

Each of the first to fourth external electrodes 14a to 14d may be composed of a single conductive layer, and preferably, may be composed of a base layer formed on the first or second side surface 10c or 10d and a plating layer formed on the base layer. The base layer can be made of metal (e.g., copper, nickel, silver, palladium, or gold) or an alloy (e.g., an alloy of silver and palladium), for example. The base layer may be made by co-firing of firing simultaneously with the internal electrodes or by post-firing of applying and baking conductive paste. Alternatively, the base layer may also be formed by plating or by hardening of conductive resin containing thermosetting resin. The maximum thickness of the base layer may preferably be approximately 10 μm to 50 μm, for example.

The plating layer on the base layer can be made of metal (e.g., copper, nickel, silver, palladium, or gold) or an alloy (e.g., an alloy of silver and palladium), for example. The plating layer may be multilayered or a single layer. One preferable example is the one in which the plating layer is a multilayer structure of a nickel plating layer formed on the base layer and a tin plating layer formed on the nickel plating layer. The thickness of a single plating layer is not especially limited, and it may preferably be approximately 1 μm to 10 μm, for example.

A conductive resin layer for use in relieving stress may be disposed between the base layer and the plating layer.

The first and second external electrodes 14a and 14b are spaced apart from each other in the longitudinal direction L on the first side surface 10c. The upper end of each of the first and second external electrodes 14a and 14b extends to the first main surface 10a. That is, the first and second external electrodes 14a and 14b include upper surface portions 14a1 and 14b1, respectively, positioned on the first main surface 10a. The lower end of each of the first and second external electrodes 14a and 14b extends to the second main surface 10b. In the present preferred embodiment, the upper surface portions 14a1 and 14b1 have a substantially semicircular planar shape. However, the planar shape of each of the upper surface portions 14a1 and 14b1 may be substantially rectangular or semi-oval, for example.

The third and fourth external electrodes 14c and 14d are spaced apart from each other in the longitudinal direction L on the second side surface 10d. The upper end of each of the third and fourth external electrodes 14c and 14d extends to the first main surface 10a. That is, the third and fourth external electrodes 14c and 14d include upper surface portions 14c1 and 14d1, respectively, positioned on the first main surface 10a. The lower end of each of the third and fourth external electrodes 14c and 14d extends to the second main surface 10b. In the present preferred embodiment, the upper surface portions 14c1 and 14d1 preferably have a substantially semicircular planar shape. However, the planar shape of each of the upper surface portions 14c1 and 14d1 may be substantially rectangular or semi-oval, for example.

As illustrated in FIG. 2, the first external electrode 14a and the third external electrode 14c are arranged at substantially the same location in the longitudinal direction L. Specifically, the first and third external electrodes 14a and 14c are positioned at the L1 side in the longitudinal direction L. As illustrated in FIG. 2, the second external electrode 14b and the fourth external electrode 14d are arranged at substantially the same location in the longitudinal direction L. Specifically, the second and fourth external electrodes 14b and 14d are positioned at the L2 side in the longitudinal direction L.

As illustrated in FIGS. 3 to 5, the first external electrode 14a and the fourth external electrode 14d are connected to the second internal electrode 12b, whereas the second external electrode 14b and the third external electrode 14c are connected to the first internal electrode 12a.

In the present preferred embodiment, the minimum distance $L_2$ (see FIG. 2) between the first and third external electrodes 14a and 14c and the second and fourth external electrodes 14b and 14d along the longitudinal direction L preferably is approximately 0.1 mm to 4.5 mm, and the monopole $W_2$ between the first and second external electrodes 14a and 14b and the third and fourth external electrodes 14c and 14d along the width direction W preferably is approximately 0.1 mm to 4.5 mm.

In the present preferred embodiment, the first to fourth external electrodes 14a to 14d are arranged such that the shape D formed by joining the centers C1 to C4 of the upper surface portions 14a1 to 14d1 with a substantially straight line is substantially square. That is, all the distance between the center C1 of the upper surface portion 14a1 and the center C2 of the upper surface portion 14b1, the distance between the center C2 of the upper surface portion 14b1 and the center C4 of the upper surface portion 14d1, the distance between the center C4 of the upper surface portion 14d1 and the center C3 of the upper surface portion 14c1, and the distance between the center C3 of the upper surface portion 14c1 and the center C1 of the upper surface portion 14a1 are substantially the same.

In the present invention, "the center of an upper surface portion" indicates the graphical center of the upper surface portion.

The expression "the distances are substantially the same" indicates that the distances are virtually equal such that they are regarded as substantially the same in image-calculation performed by the use of an imaging device for determining the orientation of the electronic component 1 and is not limited to a case where they are exactly the same.

In the present preferred embodiment, as illustrated in FIGS. 1 and 2, the orientation identifying mark 20 is disposed on the first main surface 10a. The orientation identifying mark 20 passes through the intersection of two diagonals of the substantially square shape D, that is, the center C5 of the substantially square shape D, is substantially linear, and extends along the width direction W. Accordingly, in determining the orientation of the electronic component 1, in addition to the upper surface portions 14a1 to 14d1 of the first to fourth external electrodes 14a to 14d, the orientation identifying mark can be identified by the use of, for example, an imaging device. Because the orientation identifying mark 20 has an elongated shape that extends along the width direction W, the orientation of the electronic component 1 can be easily and accurately determined by identifying the direction in which the orientation identifying mark 20 extends by the use of the imaging device.

In the present preferred embodiment, the length $W_1$ of the orientation identifying mark 20 may preferably be longer than the longer of the length $W_3$ of each of the first to fourth external electrodes 14a to 14d along the width direction W and the length $L_3$ thereof along the longitudinal direction L.

In the present preferred embodiment, the length $W_1$ of the orientation identifying mark 20 is longer than the minimum distance $L_2$ between the first and third external electrodes 14a and 14c and the second and fourth external electrodes 14b and 14d along the longitudinal direction L. Accordingly, the orientation of the electronic component 1 can be determined more easily and accurately.

In the present preferred embodiment, the orientation identifying mark 20 extends along the width direction W. However, the orientation identifying mark 20 may extend along the longitudinal direction L.

The orientation identifying mark 20 may preferably be disposed on both the first main surface 10a and the second main surface 10b.

In the present preferred embodiment, the orientation identifying mark 20 preferably is substantially rectangular. However, the orientation identifying mark 20 is not especially limited as long as it is substantially linear, that is, elongated. For example, it may be oval.

The aspect ratio of the orientation identifying mark 20 may preferably be between 2 and 20 inclusive. If the aspect ratio of the orientation identifying mark 20 is less than 2, it may be difficult to determine the orientation. If the aspect ratio of the orientation identifying mark 20 exceeds 20, the width of the orientation identifying mark 20 may be so small that imaging is difficult.

The material and method of forming the orientation identifying mark 20 are not especially limited. Examples of the material of the orientation identifying mark 20 include metal, an alloy, ceramic, resin, and paint. If the orientation identifying mark 20 is made of metal or an alloy, it may preferably be made of the same material as the internal electrodes 12a and 12b.

Examples of the method of forming the orientation identifying mark 20 can include various printing methods, such as printing it with paste that contains metallic fine particles or ceramic fine particles, thin-film forming, ink jet printing, and screen printing.

In terms of enhancement of visibility of the orientation identifying mark 20, the color of the orientation identifying mark 20 may preferably be different from the color of the electronic component body 10. For example, if the electronic component body 10 is brown, the orientation identifying mark 20 may preferably be white or silver.

The method of manufacturing the electronic component 1 according to the present preferred embodiment is not especially limited. One example manufacturing method is described below.

First, ceramic green sheets, paste for use in forming an internal electrode, and paste for use in forming an external electrode are prepared. Each of the ceramic green sheets, paste for use in forming an internal electrode, and paste for use in forming an external electrode may contain a binder or solvent. The binder and solvent can be publicly known.

Then, a specific pattern is printed on ceramic green sheets by the use of the paste for use in forming an internal electrode by, for example, screen printing to form a pattern for use in forming an internal electrode. At this time, a pattern for use in an orientation identifying mark is formed on the topmost ceramic green sheet by the use of paste, such as the paste for use in forming an internal electrode.

Then, a specific number of ceramic green sheets that have no patterns for use in forming an internal electrode and that are for use in an external layer are stacked, and the plurality of ceramic green sheets having patterns for use in forming an internal electrode are stacked thereon. Furthermore, a specific number of ceramic green sheets that have no patterns for use in forming an internal electrode and that are for use in an external layer are stacked thereon, and finally, a ceramic green sheet having the pattern for use in forming an orientation identifying mark is stacked thereon. In this way, a mother multilayer structure is produced.

Then, the mother multilayer structure is pressed in a lamination direction by the use of a device, such as a hydrostatic press.

The pressed mother multilayer structure is cut into raw ceramic multilayer structures of specific size. After cutting, corners or edges of the ceramic multilayer structures may be beveled or radiused by, for example, barrel polishing.

Then, the raw ceramic multilayer structures are fired. The firing temperature varies depending on the type of ceramic and paste for use in forming an internal electrode. For example, they may preferably be fired at approximately 900° C. to 1,300° C.

The paste for use in forming an external electrode is applied to both end surfaces of the fired ceramic multilayer structures and baked, thus forming a base layer of an external electrode. The baking temperature can be approximately 700° C. to 900° C., for example. A plating layer is formed on the base layer, thus forming first to fourth external electrodes. In this way, an electronic component according to the present preferred embodiment is obtainable. In a plating-layer forming step, a plating layer may also be formed on the orientation identifying mark.

Another preferred embodiment of the present invention is described below. In the following description, the same reference numerals are used as in the first preferred embodiment for elements having substantially common functions, and the detailed description is not repeated here.

Second Preferred Embodiment

Figure 6:
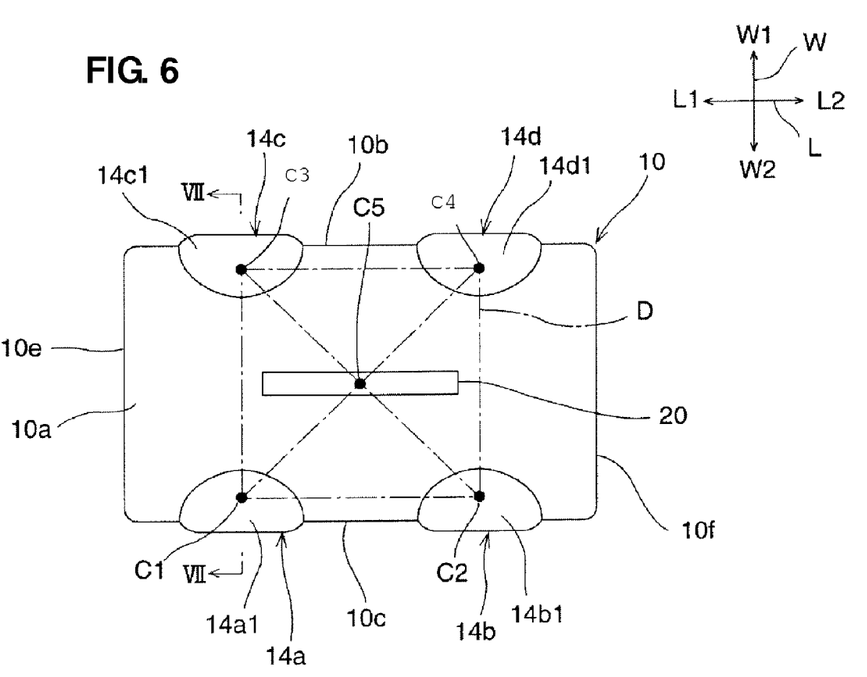
FIG. 6 is a schematic plan view of a multilayer ceramic electronic component according to a second preferred embodiment of the present invention.
Figure 7:
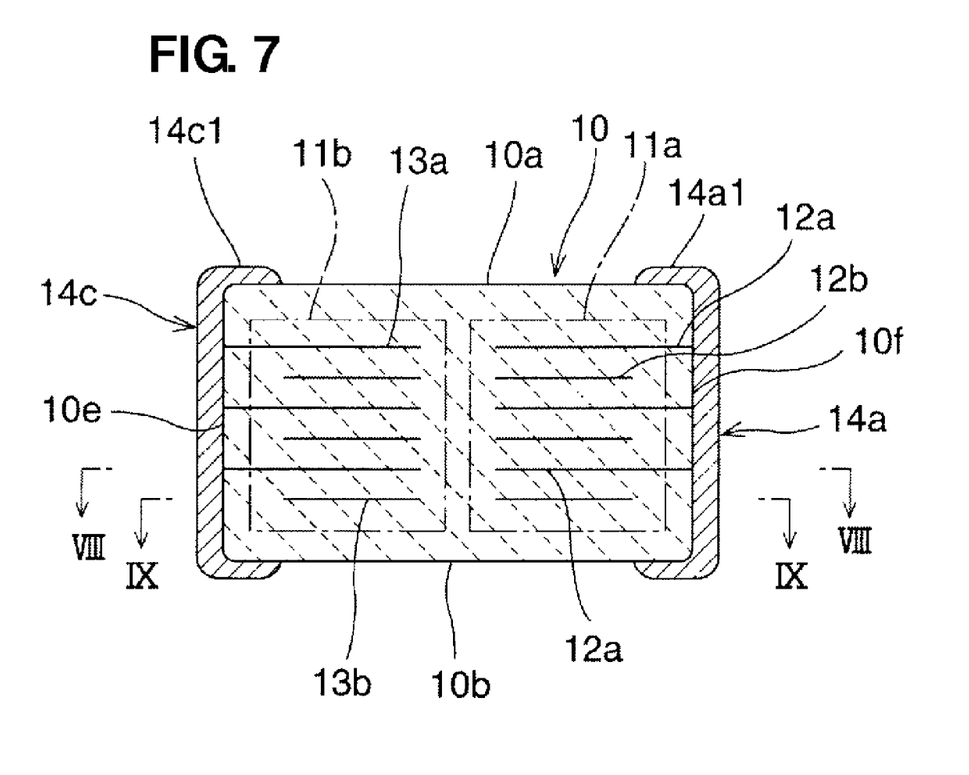
FIG. 7 is a view taken along the line VII-VII in FIG. 6.
Figure 8:
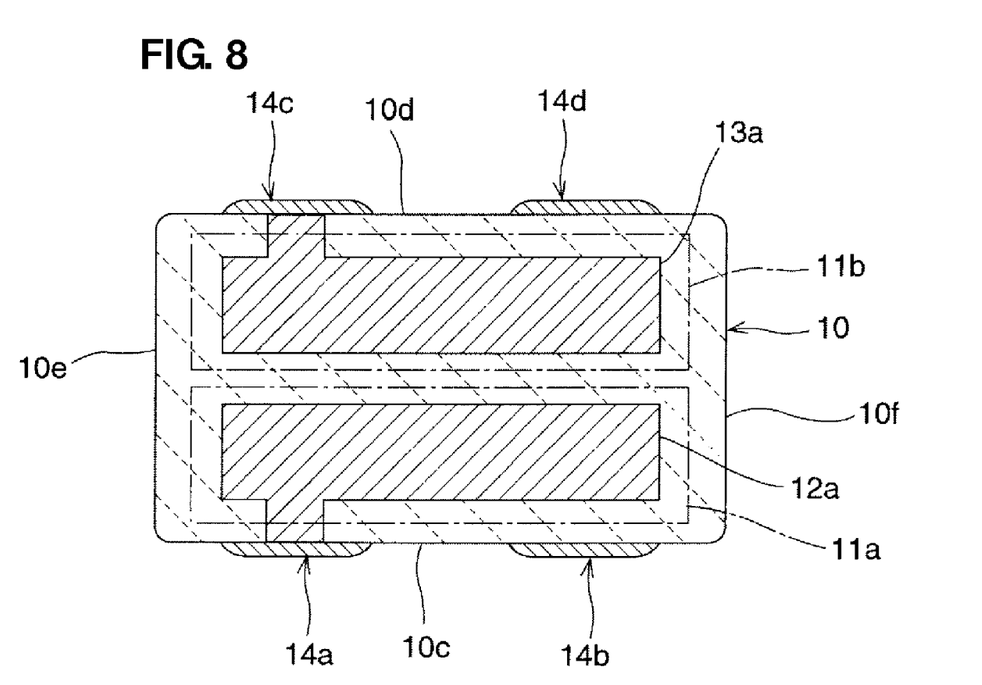
FIG. 8 is a view taken along the line VIII-VIII in FIG. 7.
Figure 9:
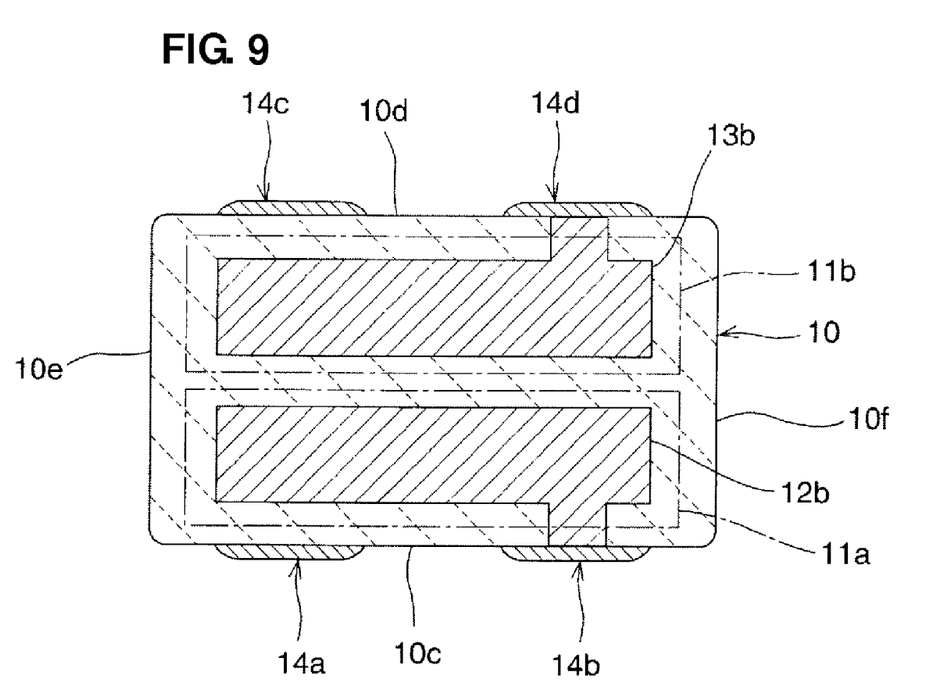
FIG. 9 is a view taken along the line IX-IX in FIG. 7.

FIG. 6 is a schematic plan view of a multilayer ceramic electronic component according to a second preferred embodiment. FIG. 7 is a view taken along the line VII-VII in FIG. 6. FIG. 8 is a view taken along the line VIII-VIII in FIG. 7. FIG. 9 is a view taken along the line IX-IX in FIG. 7.

In the present preferred embodiment, the electronic component includes first and second functional units 11a and 11b. The first and second functional units 11a and 11b independently perform electric functions. The specific functions of the first and second functional units 11a and 11b are selected depending on characteristics of the electronic component 1. Each of the first and second functional units 11a and 11b may be a piezoelectric unit that produces the piezoelectric effect, a capacitor unit, a thermistor unit, or an inductor unit. The first and second functional units 11a and 11b may have the same functions or different functions. Specifically, each of the first and second functional units 11a and 11b may be a capacitor unit, for example. Alternatively, the first functional unit 11a may be a capacitor unit, and the second functional unit 11b may be a piezoelectric unit. Alternatively, the first functional unit 11a may be a capacitor unit, and the second functional unit 11b may be an inductor unit. In this case, the electronic component 1 is an LC composite array component. When the functional unit is a capacitor unit, a coil internal electrode may preferably be disposed in the electronic component body 10.

In the present preferred embodiment, as illustrated in FIGS. 7 to 9, the first and second functional units 11a and 11b are arranged along the width direction W. However, the present invention is not limited to this configuration. For example, the first and second functional units may be arranged along the longitudinal direction L.

In the first functional unit 11a, the first and second internal electrodes 12a and 12b are alternately disposed so as to be spaced apart from each other along the height direction H. Similarly, in the second functional unit 11b, third and fourth internal electrodes 13a and 13b are alternately disposed so as to be spaced apart from each other along the height direction H. The first to fourth internal electrodes 12a, 12b, 13a, and 13b extend along the longitudinal direction L. No internal electrode is disposed at a central portion in the width direction W in the electronic component body 10.

As illustrated in FIG. 8, the first external electrode 14a is connected to the first internal electrode 12a. As illustrated in FIG. 9, the second external electrode 14b is connected to the second internal electrode 12b. That is, the first and second external electrodes 14a and 14b define a terminal electrode of the first functional unit 11a. As illustrated in FIG. 8, the third external electrode 14c is connected to the third internal electrode 13a. As illustrated in FIG. 9, the fourth external electrode 14d is connected to the fourth internal electrode 13b. That is, the third and fourth external electrodes 14c and 14d form a terminal electrode of the second functional unit 11b.

The material of each of the third and fourth external electrodes 14c and 14d is not especially limited as long as it is conductive. For example, the third and fourth external electrodes 14c and 14d can be made of metal (e.g., copper, nickel, silver, palladium, or gold) or an alloy (e.g., an alloy of silver and palladium). The thickness of each of the third and fourth external electrodes 14c and 14d is not especially limited, and it may preferably be approximately 0.3 μm to 2 μm, for example.

In the present preferred embodiment, the orientation identifying mark 20 is disposed along the longitudinal direction L, as illustrated in FIG. 6. Also in this case, the orientation of the electronic component 1 can be easily and accurately determined, as in the case of the above first preferred embodiment of the present invention.

In the present preferred embodiment, in plan view, the orientation identifying mark 20 is disposed between the first and second internal electrodes 12a and 12b and the third and fourth internal electrodes 13a and 13b. That is, the orientation identifying mark 20 is disposed on a portion where no internal electrode is disposed and where the dimension in the height direction is small. Accordingly, the provision of the orientation identifying mark 20 between the first and second internal electrodes 12a and 12b and the third and fourth internal electrodes 13a and 13b in plan view can reduce projection of the orientation identifying mark 20 in the height direction H.

The above first and second preferred embodiments are described using a ceramic electronic component as one example of preferred embodiments of the present invention. It is to be noted that in the present invention an electronic component is not limited to a ceramic electronic component and can be the one in which an electronic component body is made of a material other than ceramic.

While preferred embodiments of the present invention have been described above, it is to be understood that variations and modifications will be apparent to those skilled in the art without departing from the scope and spirit of the invention. The scope of the present invention, therefore, is to be determined solely by the following claims.

What is claimed is:

1. An electronic component comprising:
   an electronic component body having a substantially rectangular parallelepiped shape, the electronic component body including first and second main surfaces extending along a longitudinal direction and a width direction, first and second side surfaces extending along the longitudinal direction and a height direction, and first and second end surfaces extending along the width direction and the height direction;
   first and second external electrodes spaced apart from each other in the longitudinal direction on the first side surface and extending to the first main surface; and
   third and fourth external electrodes spaced apart from each other in the longitudinal direction on the second side surface and extending to the first main surface; wherein
   the first to fourth external electrodes are arranged such that a shaped defined by joining centers of portions of the first to fourth external electrodes on the first main surface with a substantially straight line is substantially square; and
   the first main surface is provided with a substantially linear orientation identifying mark disposed thereon, the orientation identifying mark passing through an intersection of two diagonals of the substantially square shape and extending along the longitudinal direction or the width direction.

2. The electronic component according to claim 1, wherein the orientation identifying mark has a length that is longer than the longer of a length of each of the first to fourth external electrodes along the longitudinal direction and a length thereof along the width direction.

3. The electronic component according to claim 1, wherein the electronic component body is provided with first and second functional units, at least one of the first to fourth external electrodes is connected to the first functional unit, and the remaining external electrodes are connected to the second functional unit.

4. The electronic component according to claim 3, wherein the first and second external electrodes are connected to the first functional unit, and the third and fourth external electrodes are connected to the second functional unit.

5. The electronic component according to claim 3, wherein each of the first and second functional units is a piezoelectric unit arranged to produce a piezoelectric effect, a capacitor unit, a thermistor unit, or an inductor unit.

* * * * *